United States Patent [19]

Bramall

[11] Patent Number: 5,771,101
[45] Date of Patent: Jun. 23, 1998

[54] DATA SECURITY SYSTEM

[75] Inventor: Roy Bramall, Chesterton, United Kingdom

[73] Assignee: Gestetner Management Limited, London, England

[21] Appl. No.: 776,876

[22] PCT Filed: Aug. 1, 1995

[86] PCT No.: PCT/GB95/01821

§ 371 Date: Mar. 27, 1997

§ 102(e) Date: Mar. 27, 1997

[87] PCT Pub. No.: WO96/04746

PCT Pub. Date: Feb. 15, 1996

[30] Foreign Application Priority Data

Aug. 2, 1994 [GB] United Kingdom .................. 9415540

[51] Int. Cl.⁶ ..................................................... H04N 1/44
[52] U.S. Cl. ............................ 358/405; 358/406; 380/23; 399/366
[58] Field of Search .................................... 358/400–406, 358/434–436, 404, 444, 468; 399/80, 366, 367; 380/18, 20–21, 23; H04N 1/44

[56] References Cited

U.S. PATENT DOCUMENTS 5,444,779  8/1995  Daniele ..................................... 380/23
5,610,688  3/1997  Inamoto .................................. 399/366

FOREIGN PATENT DOCUMENTS

542462 A2  5/1993  European Pat. Off. .
2277421   10/1994  United Kingdom .

Primary Examiner—Kim Yen Vu
Attorney, Agent, or Firm—William D. Lee, Jr.; Cort Flint

[57] ABSTRACT

A data security system envisages the identification of a pre-authorized user of data handling equipment and the storage of both the data processed by that user and the identification of the user, for subsequent accessing by security staff. Unless the user has been pre-authorized, the system will fail to activate even when identity has been established. In one embodiment image data representing a copied original and the identification of the user are stored.

11 Claims, 1 Drawing Sheet

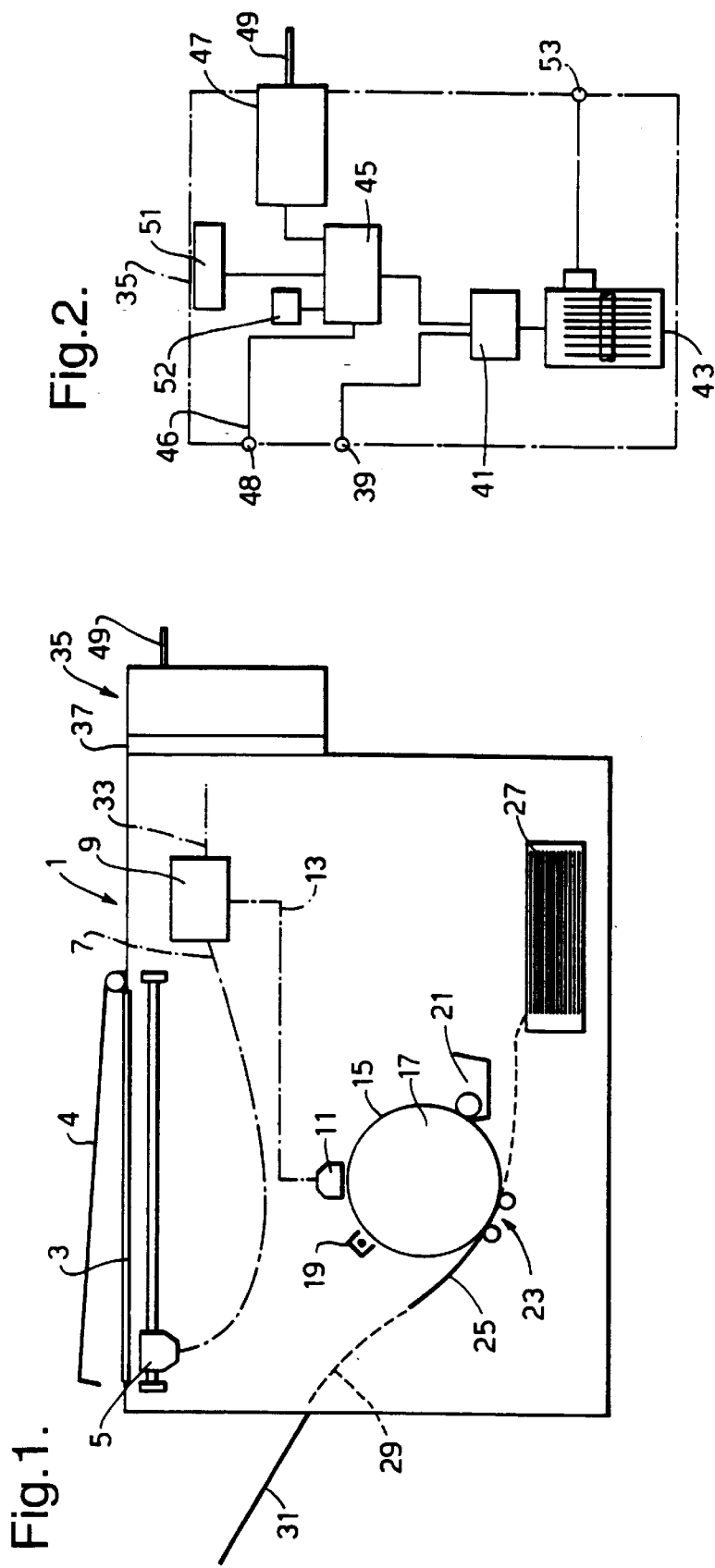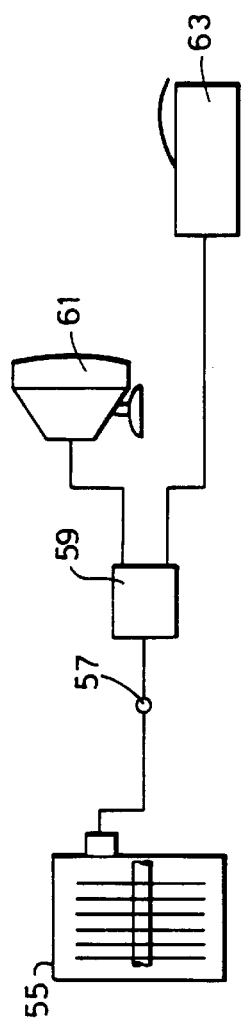

5,771,101

DATA SECURITY SYSTEM

The present invention relates to a security system for data handling, for example to be applied to a photocopier, a facsimile transmitter/receiver, or a PC or network computer system.

In various security sensitive areas, for example in military procurement agencies, or in banks and professional legal offices, or in diplomatic offices, there is a risk of documents being copied illicitly, by persons with or without authorisation, and hence leading to leakage of data. Similarly, there is a risk of images being transmitted by facsimile machines without authorisation. It is a problem to control such unauthorised handling of data, and hitherto no effective solution has been found.

Equipment is available for monitoring the use of data handling equipment such as photocopiers, for example where several users of a photocopier may each be issued with an authorisation card permitting them to make a given number of copies, and the system then audits the use of the photocopier to bar a particular card once the user has consumed his or her available authorised number of copies. Likewise, certain facsimile machines may have the option of requiring a user to enter a password or code before being able to despatch information. Furthermore several computer systems, both PC and network-based, use password-authorised access to a user.

Such systems are useful in that the photocopier and/or facsimile equipment just described enables some form of audit to be kept on the volume of use of the equipment. Furthermore, the password-authorised access to a computer system ensures that only those with a "need-to-use" are given access to the computer, and it is possible for there to be various levels of authorised user such that many users may be given access to read off the data on the computer but only a few may be given access to change the data.

In an attempt to prevent unauthorised leakage of information which may be transmitted by, or stored in, data handling equipment, the present invention proposes to log not only the identity of the user but also the data which that particular user has handled.

Accordingly, one aspect of the present invention provides a data security system comprising image data handling equipment; user identification means for generating information indicative of the unique identity of a pre-authorised user; means for recording information indicative of the identity of users pre-authorised to use said image data handling equipment; means for comparing the identity-indicating information from said user identification means with the information recorded by said means for recording information indicative of pre-authorised users, for establishing pre-authorisation of the user to use the equipment; means for disabling the image data handling equipment in the absence of establishing such pre-authorisation of the user; image data receiving means; and data storage means connected to receive image data from said image data receiving means and user identification information from said user identification means, for storing in reproducible form in association with one another the image data of an image being processed and the user identification information of the user processing said image.

A second aspect of the invention provides a method of deterring unauthorised or illicit use of data comprising storing data which has been processed or accessed by the user of image data handling equipment; identifying the user of said image data; recording user identification information unique to the user of the image data handling equipment; disabling the image data handling equipment in the event of the user identification information revealing the identity of a user who is not a pre-authorised user; and recording the identification of said user along with the data used, for subsequent accessing of the user identification and data used.

A third aspect of the present invention provides a method of deterring unauthorised or illicit use of data comprising storing data which has been processed or accessed by the user of data handling equipment, means for identifying the user of said data, and means for recording the identification of said user along with the data used, for subsequent accessing of the user identification and data used.

In order that the present invention may more readily be understood the following description is given, merely by way of example, with reference to the accompanying drawings, in which:

FIG. 1 is a schematic view of a photocopier incorporating a data security system in accordance with the present invention;

FIG. 2 is a detailed schematic block diagram of the security audit device (SAD) incorporated in the photocopier of FIG. 1; and FIG. 3 is a schematic view of the audit interrogation equipment to be used with the security audit device of FIG. 2.

FIG. 1 shows a photocopier 1 in which the image on a document 3 is scanned by an electro-optical scanning head 5 whose output signal is transmitted along a flexible line 7 to an image handling unit 9. At the image handling unit 9, the digital data from the travelling scanning head 5 may be processed so as to effect magnification or reduction when the image is printed at a print head 11, or can be processed in some other way (such as to change the contrast of the printed image). The image is transferred from the image handling unit 9 to the print head 11 along a transmission line 13.

In the conventional manner, the image printed at the print head 11 is transferred in the form of a latent electro-static image to the electrically charged surface 15 of a photoconductor drum 17 which has been charged by a charging unit 19. The image is then developed by application of toner to the image areas by means of a developer unit 21 so that the thus developed toner image can be transferred at an image transfer station 23 to a sheet 25 coming from a sheet feeder 27 and passing along a sheet path 29 to a delivery tray 31. This sequence of operations on a photoconductor surface passing the charging unit 19, the electrostatic latent image formation unit (print head 11), the developer 21 and the image transfer station 23 is common to most if not all conventional photocopiers, including those having a purely optical transmission of the image from the scanning head 5 to the image transfer station 23 and delivery of the printed sheet at tray 31.

In accordance with the present invention a second image transmission line 33 is connected to a security audit device (SAD) 35 which is removably mounted on the body of the photocopier 1 by means of an interface 37.

The security audit device is shown in more detail in FIG. 2 as comprising an inlet connector 39 carrying digital data representative of the images being copied by the photocopier 1. This data is transferred to a data merging unit 41 which then passes its output onward to a storage unit 43 in this case in the form of a write-capable of CD record/play unit.

Another input to the data merging unit 41 comes from a user data reader encoder 45 which receives signals from a card reader 47 using either a swipe card system or a conventional credit card-style magnetic card reader. The card, shown at 49, may be replaced by any other form of personal hardware to identify the user.

Simultaneously with the acquisition of a signal read from the card 49 by the reader 47, the user data encoding unit also receives signals from a keyboard 51 where the user can enter personal identification data such as a personal identification number (PIN) or a password. The data thus generated by the encoder 45 is merged at 41 with the data representative of the image being handled, and is then stored by the CD ROM record/play unit 43. The CD ROM unit 43 may be replaced by any other suitable form of storage unit capable of handling large quantities of data.

The user identification data encoder 45 also includes means for checking the information input at the keyboard 51 against the information read off the card 49 and to verify that the user's identity corresponds to pre-recorded user identification information signifying pre-authorisation of that user to access the copier 1. A successful verification will result in an "authorise copier" signal on an output line 46 from the encoder 45 to be passed back to the copier 1 via a copier enable port 48.

The write-capable CD ROM system is particularly convenient as it is known that such a system is already available for image storage and reproduction so as to be capable of storing over 2000 full colour images on a single 5.25" CD ROM disc, and the number of monochrome images available will be considerably greater.

In order to expand the memory capacity of the storage unit 43 it is envisaged that the CD ROM record/play unit will include a cassette of several CDs which can be filled sequentially. Equally, they may be played back sequentially in the case where the security audit device includes the play port 53.

The data stored on the CD ROM discs in the record/play unit 43 may be subjected to compression/encryption techniques in order to expand the quantity of data which can be stored in this way. The encryption code for the CD ROM record/play unit will be held on a an EP ROM within the security audit device 35, using a code reference selected by the user authority of the data handling system.

In the context of the security audit device 35 applied to a photocopier, there are certain measures which can be taken in order to avoid unnecessary cluttering of the data store such as the CD ROM disc.

For example, on a multi-copy print run there is need for only one of the images to be stored so it would be acceptable for the first copied image to be stored along with the user identification data, on the assumption that the same image has been copied in each cycle of the multi-copy run. In order to ensure this is the case, other measures (to prevent image substitution) may be taken such as recording of a "platen open" signal arising during a multi-copy run (indicating that the platen has been opened to permit the first document to be replaced by a further document which would otherwise not be recorded in the data store), or by the provision of some form of image recognition unit which will either (i) register an "all-black" image indicative of removal of one document and replacement by another, or (ii) register the substitution of a first document by a second (or even simple movement of the original during a multi-copy print run). Such a system will effectively provide verification that the image is always the same during a multi-copy run, thereby legitimately permitting avoidance of the need to store each and every image copied. An alarm may be given, or recorded, in the case of such an image substitution.

The security audit device 35 is provided with an output port 53 which allows a disc in the CD ROM record/play device 43 to be interrogated by plugging a monitor and/or printer into the port 53.

An alternative possibility is for the cassette of CD ROM discs to be removed from the unit 43 and to be placed in a CD ROM player 55 (FIG. 3) for interrogation purposes. In other words, it is not necessary for the device 43 to be capable of both recording and playing, but it must at least be capable of recording the data received from the data merging unit 41.

In the FIG. 3 installation, the CD ROM player 55 has its outlet or play port 57 connected to the input of a control unit 59 such as a PC which can supply a monitor screen 61 and/or a printer 63 to reproduce the image either in instantaneously observable form on the monitor 61 or in hard copy print form at the printer 63.

In the FIG. 3 embodiment where the cassette is removed from the security audit device 35 and placed in a CD ROM player 55, the PC 59 serving as the control unit will also enforce password protection screening to ensure that the same code which was encrypted onto the EP ROM to control the encryption code for the CD ROM in the security audit device 35 has been entered on the PC 59 before viewing of the data on the monitor screen 61 or before printing on the printer 63 can be carried out. In other words, only specifically identified personnel, e.g. authorised security personnel will be able to access the information stored on the CD ROM.

Image data and operator identification data will be simultaneously shown on the screen in order to allow a security check to be made. If observation on the screen 61 suggests that a risk situation exists, a print can then be made using the printer 63, to provide a hard copy for further investigation.

Over a period of time the CD ROM discs can be archived in a secure storage area, thereby replacing any manual chronologically based hard copy system which may have been enforced in the past in order to provide some security of data.

An example will now be given of the use of the security system shown in FIGS. 1 to 3.

When a user wishes to make a copy using the photocopier 1 of FIG. 1 he or she must first of all enter his personal identification card 49 in the card reader 47 (for example by swiping the card through in the case of a swipe card reader or by inserting his card in the case of a captive credit card reader), and he or she must also enter his or her password or PIN on the keyboard 51.

The user identification data encoder 45 then compares the PIN or password with the data read from the card 49 and generates a "copy authorisation" signal on the transmission line 46 to the "copier enable" port 48. Such a signal at the port 48 is necessary in order for the copier to be capable of then scanning the image on the platen when the "copy" button of the photocopier is pressed.

Although it could be a requirement that the user repeats the card swiping operation and the PIN/password entry operation for each new original or series of originals in a multi-original run using an automatic document feeder (ADF), it is envisaged that the user may be required to clear his or her identification data by an appropriate control on the photocopier, and that he or she will do so before leaving the copier available for the next user.

Each time the platen is opened and a new original 3 is inserted, the user identification data encoder 45 will prepare user identification tag signals comprising firstly the identification of the owner of the card 49 and secondly the date and time indicated by a clock unit 52. This data is then transmitted to the data merging unit 41 together with the image data of the first original received from the image data input port 39 of the security audit device 35, and a data block comprising the digital image data of the first copy and the date/time and user identification information is then stored on the CD ROM disc or other storage means.

When a particular user has finished with the photocopier and has cleared his or her identification data (and removed his or her ID card in the case of the credit card type of reader), the next user will need to go through the above-mentioned sequence of operations in order to produce one or more photocopies.

At any stage security personnel may carry out a security audit by either accessing the data output port 53 of the storage unit 43 when this is in the form of a CD ROM record/play unit, or by removing the cassette of CD ROM discs and inserting them in the CD ROM play unit 55 of FIG. 3. The interrogation operation will then be much the same regardless of which of the two systems is available, in that the security person will firstly need to enter the appropriate encryption code data in order to be able to access the information from the CD ROM play operation either on the screen 61 or, if necessary, on the printer 63. In the control unit 59 (FIG. 3) this encryption code data will be checked against the encryption code data previously stored via the EP ROM, to verify the authorisation of the user of the audit facility (FIG. 3). As indicated above, the printer 63 will normally only be used when observation on the screen 61 indicates that a security risk has been detected.

The security audit device 35 is supplied separately from the photocopier but is intended for use with a copier which is SAD-compatible (i.e. has an interface 37 for attachment of the SAD).

The "copy enable" port on the photocopier will be linked to the image data output port of the photocopier in such a way that when there is no SAD 35 connected to the photocopier there will be no requirement for a "photocopy authorise" signal to be received before the photocopier can be used.

The security audit devices 35 are thus able to be shared between a larger number of photocopiers with a view to employing them in selected areas, or at selected times, at which the risk of breach of security is considered to be heightened.

Thus far the specific example given has been related to the use of a photocopier with an SAD.

The same or a similar system can be used in conjunction with a facsimile transmit/receive unit in that the facsimile transmit operation may only be authorised when matching PIN/password data and a user identification card have been entered in a security audit device (SAD) associated with the facsimile machine. The SAD will be designed to acquire the identification of the addressee of a Fax transmission as well as the user identification data and the time/date information and the image data taken from the scanner of the facsimile transmitter.

A similar use for the SAD can be found during facsimile receiving where the input of user identification data from an ID card and PIN/password keying will be necessary before a received facsimile can be printed and delivered upon receipt.

The manner in which the facsimile transmitter/receiver and the SAD are associated with one another will be evident from the above description and illustration of the photocopier/SAD combination so no separate illustration or further description is necessary.

As indicated above, a further application for the security audit system of the present invention is in the context of a PC or a networked computer work station where the entering of user identification data by at least password or PIN identification, and the time of use information as well as the accessed data information (referred to herein as "image data") will be stored by the SAD.

With suitable software, the possibility also exists of being able to encode activating instructions for the SAD so that low security classification information may be accessed without storing for audit and using up valuable storage space on the SAD, whereas higher classification equipment may automatically activate the SAD for user identification.

Existing password-protected computer installations provide a measure of protection in ensuring that someone who does not have a compatible password or PIN cannot access the computer. However, leaks are often thought to be attributable to personnel having a right of access to the information but who are misusing the trust imposed in them by leaking a hard copy of or by facsimile transmission of, the protected data. Using a security audit device such as is contemplated in accordance with the present invention allows a later investigation to be made of the data which was used, and the identification of the user in question, and if appropriate an indication of the date and time when the information was handled. This will enable subsequent questioning of any personnel suspected to have been involved in a breach of security, and the mere fact that this identification is available should serve to deter any authorised user contemplating leaking information from the secure area protected by the system.

In order to ensure that anyone contemplating leaking information does not disable the SAD, it is envisaged that it will be incorporated within a secure casing which will be resistant to mechanical and/or chemical attack and may even be alarmed in order to ensure that any abuse of the SAD will alert the security personnel to investigate the particular installation on which the alarm is annunciating.

One particularly appropriate form of data handling equipment for the application of this invention is the device known as an LHO which provides a combination of the functions of a B3 photocopier, a facsimile transmitter/receiver, and a printer.

I claim:

1. A data security system comprising image data handling equipment (1); user identification means (51, 47) for generating information indicative of the unique identity of a pre-authorised user; means for determining whether use of the image data handling equipment (1) is pre-authorised; means for changing the operating state of the image data handling equipment in the event of attempted non pre-authorised use; image data receiving means (48); and data storage means (43) connected to receive image data and to receive user identification information from said user identification means (51, 47), and operative to store in reproducible form in association with one another the image data of an image being processed and the user identification information of the user processing said image;

characterised in that the pre-authorisation of use is related to the identity of the user;

in that there are means for recording information which is indicative of the identity of users pre-authorised to use said image data handling equipment; in that there are means for comparing the identity-indicating information from said user identification means with the information recorded by said means for recording information which is indicative of pre-authorised users, for establishing pre-authorisation of the user to use the equipment;

in that the means for changing the operating state comprise means for disabling the image data handling equipment in the absence of establishing such pre-authorisation of the user;

and in that the stored image data is received from said image data receiving means (48) and is data of the image data being handled.

2. A system according to claim 1, and further including time recording data acquisition means connected to said data storage means for ensuring that the stored data in said data storage means includes additionally information indicative of the time at which the data was processed on the instructions of the identified pre-authorised user.

3. A system according to claim 1, wherein said user identification means includes means for reading a user identification card (49) and a keyboard (35) for entering user identification information.

4. A system according to claim 3, wherein said user identification means includes checking means for checking consistency between the user identification card (49) and the user identification information entered on the keyboard (35).

5. A system according to any one of the preceding claims, wherein the data storage means (43) comprise a CD ROM disc recording unit having a write capability for entering the image data and the user identification data on a CD ROM disc.

6. A system according to claim 5, wherein the CD ROM disc recording unit includes a cassette for a plurality of CD ROM discs which can be sequentially filled with the image data and the user identification data.

7. A system according to any one of claims 1 to 4, wherein the data handling equipment (1) comprises a photocopier for electronically scanning originals to derive digital image data of said original and for electronically forming an electrostatic latent image in response to the digital image date of the scanned image, or a facsimile transmitter and/or receiver, allowing for identification of the operator, for identification of the user instructing despatch or reception of a facsimile copy, or a personal computer (PC), or a networked computer work station the user of which is to be identified along with the data to which that user has access.

8. A system according to claim 7, wherein the image data handling equipment is a photocopier, and including means responsive to a multiple print copy operation for transmitting to the storage means data information indicative of only the first image scanned, and including means responsive to exchange of the scanned original during a multi-copy run for signalling image substitution.

9. A method of deterring unauthorised or illicit use of image data handling equipment, comprising:-changing the operating state of said image data handling equipment (1) in the event of attempted non-pre-authorised use of said image data handling equipment; recording user identification information unique to the user of said image data handling equipment; and recording (at 43) the identification of said user, for subsequent accessing of the user identification and data used; characterised in that the non pre-authorised use is established by reference to the identity of the user of said image data; and in that the changing of the operating state of said image data handling equipment comprises disabling said image data handling equipment (1) in the event of the user identification information revealing the identity of a user who is not a pre-authorised user; and in that data which has been processed or accessed by the user of said image data handling equipment (1) is recorded along with the user identification for subsequent access.

10. A method according to claim 9, and including the step of recording the time and/or date of use of the data along with the recorded data used and user identification.

11. A method according to claim 9 or 10, wherein the step of identifying the user includes the operation of verifying that the user has presented an identification card (49) and has entered a corresponding validating personal identification number (at 35) before he or she is given access to the data handling equipment, and including the step of recording the thus verified identification information along with the data which has been used.

* * * * *